United States Patent [19]

Tezuka

[11] Patent Number: 4,929,428
[45] Date of Patent: May 29, 1990

[54] QUANTITATIVE PIPETTE

[75] Inventor: Sigeru Tezuka, Saitama, Japan

[73] Assignee: Fuji Photo Film Co., Ltd., Kanagawa, Japan

[21] Appl. No.: 312,697

[22] Filed: Feb. 21, 1989

[30] Foreign Application Priority Data

Feb. 19, 1988 [JP] Japan ................. 63-035124
Mar. 4, 1988 [JP] Japan ................. 63-49858

[51] Int. Cl.⁵ .................... B01L 3/02; B67D 5/08
[52] U.S. Cl. .................... 422/100; 73/864.13; 73/864.14
[58] Field of Search .......... 73/864.02, 864.11, 864.13, 73/864.14, 864.18; 422/100; 74/575, 577 R; 222/386, 391

[56] References Cited

U.S. PATENT DOCUMENTS 4,760,939  8/1988  Ball et al. .................... 422/100 X

FOREIGN PATENT DOCUMENTS 8404056 10/1984 World Int. Prop. O. .......... 422/100

Primary Examiner—Barry S. Richman
Assistant Examiner—Jeffrey R. Snay
Attorney, Agent, or Firm—McAulay Fisher Nissen & Goldberg

[57] ABSTRACT

A quantitative pipette comprising a cylinder, a plunger inserted into the cylinder capable of sucking and discharging a prescribed amount of liquid by the movement of the plunger at a prescribed distance, a ratchet having plural teeth at regular intervals, a driving means for rotating the ratchet, a damping means for damping the rotation of the ratchet not faster than a prescribed speed, a ratchet-engaging means capable of engaging the ratchet to stop it so as to permit the rotation of the ratchet intermittently, a pinion rotating simultaneously with the ratchet, a rack engaging the pinion and fixing said plunger, and a rotary means for rotating from the outside said ratchet or pinion opposed to the driving force of said driving means.

8 Claims, 5 Drawing Sheets

QUANTITATIVE PIPETTE

BACKGROUND OF THE INVENTION

1. Field of the Invention

This invention relates to a quantitative pipette capable of supplying repeatedly a fixed amount of a sample solution to a chemical analytical slide or the like.

2. Description of the Prior Art

Recently, clinical chemical assays through a dry process have widely been utilized because of their superiorities in the simplicity of analytical operation and in the rapidity of measurement. In the clinical chemical assay, a specific component in a liquid sample, such as glucose, urea nitrogen (BUN) or the like in blood, is analyzed quantitatively by spotting the sample onto a chemical analytical slide containing a reagent reacting with the above component, and measuring the coloration, discoloration or the like produced through the coloration, between the reagent and the specific component.

Heretofore, a prescribed amount of the sample was sucked with a pipette, and a round droplet was allowed to form at the lower end of the tip of the pipette. Then, the droplet was spotted in the central portion of the chemical analytical slide by touching it lightly with the surface.

However, in the above conventional spotting method, personal error in the spotted amount was noticeable, since the spotting work was carried out by operator's hand. A principal cause of the personal error was due to the difficulty in the keeping of a constant distance between the tip of the pipette and the spot face of the chemical analytical slide during the spotting. If a holder is used for supporting a pipette, the above personal error should be decreased. However, in this case, since the distance between the tip of the pipette and the spot face of the chemical analytical slide is fixed, it is impossible during a serial operation to form a droplet on the tip and subsequently to spot it to the spot face of the chemical analytical slide. On the other hand, there are various sample liquids to be assayed by chemical analytical slides, such as whole blood, blood plasma, blood serum, their diluted solutions, urine and saliva, and their absorption rates into the liquid-receiving layer, usually spreading layer on chemical analytical slides, are different from each other because of the differences in viscosity and the like. When the discharge rate from the pipette is too fast, a part of the droplet remains on and around the periphery of the tip resulting in an error of the spotted amount. Besides, in conventional pipettes, a total amount of a liquid sample sucked in the pipette is discharged at once. As a result, since suction and discharge should be repeated alternately, analytical work is troublesome. Some conventional pipettes can discharge the sucked sample by installments, however, such pipettes are inferior in accuracy.

SUMMARY OF THE INVENTION

An object of the invention is to provide a quantitative pipette without personal error in the spotted amount to chemical analytical slides.

Another object of the invention is to provide a quantitative pipette capable of pipetting the accurate amounts of sucked sample divided into plural times.

Such objects have been achieved by a quantitative pipette comprising a cylinder, a plunger inserted into the cylinder capable of sucking and discharging a prescribed amount of liquid by the movement of the plunger at a prescribed distance, a ratchet having plural teeth at regular intervals, a driving means for rotating the ratchet, a damping means for damping the rotation of the ratchet less than a prescribed speed, a ratchet-engaging means engaging the ratchet to stop it so as to allow the rotation of the ratchet intermittently, a pinion rotating simultaneously with the ratchet, a rack engaging the pinion and fixing said plunger, and a rotary means for rotating said ratchet or pinion opposed to the driving force of said driving means from the outside.

DETAILED DESCRIPTION OF THE INVENTION

Figure 2:
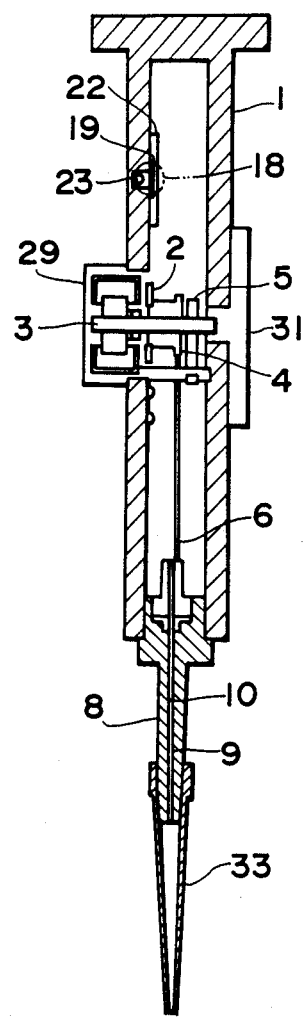
FIG. 2 is a sectional view taken on line A—A of FIG. 1.

In the quantitative pipette of the invention, the pipettable times can be varied by changing the number of the ratchet teeth, the diameter of the pinion or the length of the rack. For example, in the case that the ratio of the circumference of the pinion to the length of the rack is 1:1 and the number of the ratchet teeth is 6, a sample can be pipetted 6 times through one revolution of the ratchet. In the case that the ratio of the circumference of the pinion to the length of the rack is 1:2 and the number of the ratchet teeth is 6, a sample can be pipetted 12 times through the total length of the rack. The sucked liquid amount is determined by the elevated length of the rack i.e. of the plunger, and the diameter of the plunger. The elevated length of the rack is a multiple of the circumference length of the pinion corresponding to the pitch of the ratchet. The sucked amount is, for example, 5 to 200 $\mu$l. The discharged liquid amount of the pipette per single movement is determined by the diameter of the plunger and the stroke of the plunger per single movement due to the intermittent rotation of the ratchet. The discharged amount is, for example, 2 to 50 $\mu$l.

The driving means exert the rotating power to the ratchet. Based on this power, the ratchet, through simultaneous rotation of the pinion, causes the rack to descend, and the plunger discharges the sucked liquid. Various springs may be used as the driving means, and spiral springs are preferred in terms of exerting a uniform torque.

The damping means is incorporated for damping the rotation of the ratchet not faster than a prescribed speed. The prescribed speed is the speed beyond which the droplet formed by the liquid discharged from the plunger does not stick to the periphery of the nozzle. Preferred damping means have a function to reduce the rotation speed when it becomes high, and include known governors, oil dampers and dampers using a magnetic fluid. The damping effect may be increased by interposing a speed-increasing gear between the ratchet and the damping means such as an oil damper, and thereby increasing the rotation speed of the rotary shaft. Besides, a one-way clutch or the like may be provided between the damping means and the ratchet so that the damping means works only during the discharge of the sucked liquid.

The ratchet-engaging means engages the ratchet, and stops the rotation of the ratchet intermittently. This means may be any means capable of engaging the tooth of the ratchet successively and stopping the rotation.

The rotary means is incorporated for rotating the ratchet or pinion opposed to the driving force of the driving means from the outside, and it may be a wheel provided on the outside of which a turning force is transmitted to the ratchet or pinion. The rotary means for rotating the ratchet, or pinion may be a knob or pushing rod of which the depression power is converted to the turning force of the ratchet or pinion through a second rack. In this case, the second rack may be engaged with the pinion of the aforemention rack. Another pinion may be fixed to the shaft of the above pinion so as to rotated together, and the second rack engages this second pinion. In the latter case, the stroke of the first rack can be made longer than that of the second rack. For example, when the ratio of the tooth number of the first pinion to the second pinion is 2:1, the stroke of the first rack is twice as long as that of the second rack in accordance with the same angle or turns of their rotation. This structure is advantageous in decreasing the depressing length of the knob at the time of the suction of a liquid. The position of the knob may be the upper part or the side of the pipette.

By using the pipette of the invention, a fixed amount of a liquid can be discharged repeatedly always lower than a prescribed rate. Because of the restricted discharging rate, the discharged liquid can be supplied one after another without error to the liquid-receiving face of chemical analytical slide which is kept at a fixed distance from the lower end of the nozzle tip. The liquid supply can be repeated with a high accuracy. The quantitative pipette is particularly useful for the clinical assay in dry process using chemical analytical slides, however, it is also useful for pipetting of a sample or a reagent to an analytical cuvette in clinical assayes in conventional wet process and in general chemical analyses.

EXAMPLES

EXAMPLE 1

Figure 1:
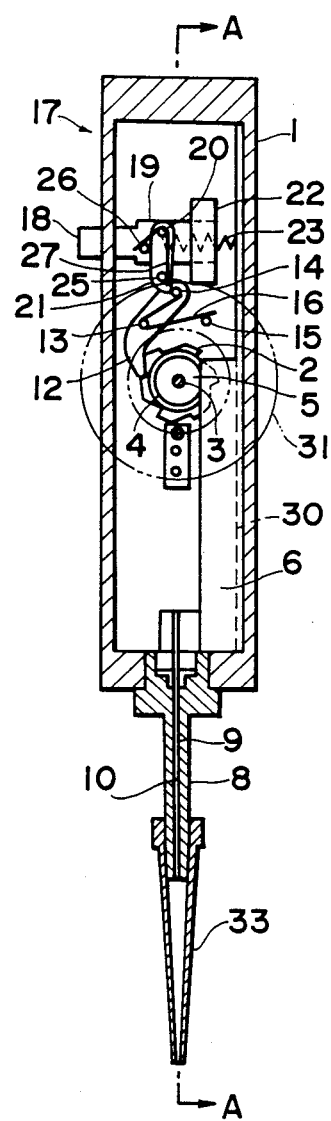
FIG. 1 is a vertical sectional view of a quantitative pipette embodying the invention.

An example of the quantitative pipette is shown in FIGS. 1 and 2.

The quantitative low speed delivery mechanism is placed in a frame 1. A ratchet 2 is rotatably supported by the frame 1 through a rotary shaft 3, and a pinion 4 is fixed to the shaft 3. A spiral spring 5 is provided between the ratchet 2 and the frame 1 as the driving means, and drives the ratchet 2 and the pinion 4 in the direction of clockwise rotation in the drawing at all times. A wheel 31 is attached to the end of the shaft 3 so that the wheel 31 is positioned on the outside of the frame 1. The ratchet 2 and the pinion 4 can be rotated opposed to the driving force of the spiral spring 5 through the wheel 31. The wheel 31 is not necessary to be fixed to the same shaft 3 of the ratchet 2 and the pinion 4, but it may rotate the ratchet 2 and the pinion 4 through a gear, a chain, a belt, a roller or the like. The ratchet and the pinion also need not be fixed to the same shaft, similarly.

The pinion 4 is engaged with the rack 6. The rack 6 is fitted into a guide channel 30, thereby guided in the vertical direction. The rack 6 is fixed with a plunger 10 inserted into the cylinder 9 of the liquid injection part 8 for sucking and discharging a liquid. A pawl 12 engages the ratchet 2 as the ratchet-engaging means, and the pawl 12 is rotatably mounted to the frame 1 through the rotary shaft 13. A leaf spring 16 is engaged between a fixed shaft 14 formed on an end of the pawl 12 and another fixed shaft 15 formed on the frame 1. The pawl 12 is driven by the spring 16 in the direction of counter-clockwise rotation in the drawing.

A release member 17 is provided neighboring to the pawl 12. The release member 17 is composed of a push button part 18 formed in a column, a plate-shaped support member 19 integrally fixed to an end of the push button part 18, and a release piece 21 mounted to the support in a rotatable state around a shaft 20. The push button part 18 penetrates the frame 1, thereby a part of the push button part is projected to the outside. The support member 19 is inserted into a guide 22, and it is slidable in a horizontal direction in the drawing. A coil spring 23 is engaged between an end of the push button part 18 and the frame 1, and it drives the push button part 18 and the support member 19. A leaf spring 27 is engaged between a fixed shaft 25 formed on an end of the release piece 21 and another fixed shaft 26 formed on the push button part 18 through the shaft 20, and the release piece 21 is driven by the spring 27 in the direction of clockwise rotation in the drawing. The ratchet 2 is intermittently engaged and released by the cooperation of the pawl 12 and the release member 17.

A nozzle tip 33 is fitted to the lower end of the liquid injection part 8.

In operation of the above quantitative pipette the lower end of the nozzle tip 33 is immersed in a liquid sample, and then the wheel 31 is rotated in the counter-clockwise direction in the drawing. So, the pinion 4 rotates in the counterclockwise direction opposed to the driving force of the spiral spring 5, and the rack 6 ascends. The plunger 10 ascends, and sucks a prescribed amount of the liquid sample into the nozzle tip 33.

Figure 3:
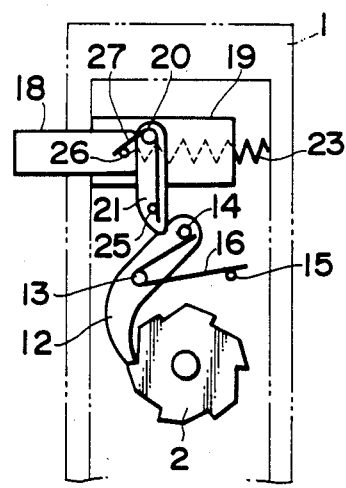
FIGS. 3 to 7 are enlarged partial views for explaining the motion of a principal part of the quantitative pipette.
Figure 4:
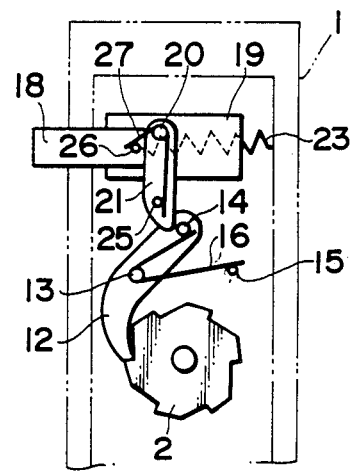
Figure 5:
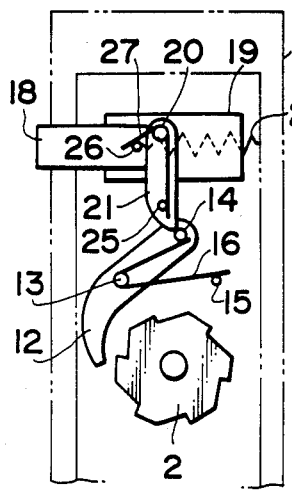
Figure 6:
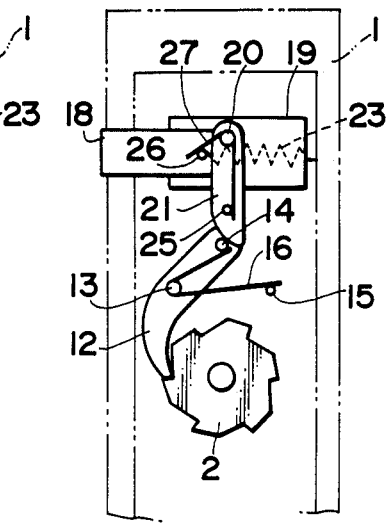
Figure 7:
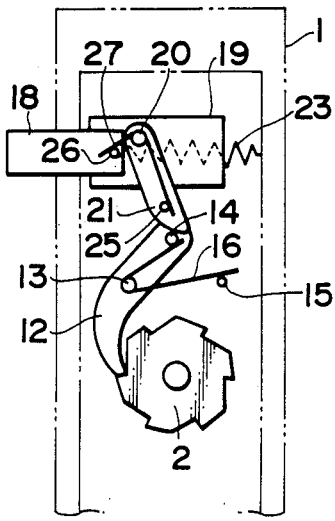

Subsequently, the push button part 18 is pushed by one action to discharge a prescribed amount of the liquid sample. At that time, as shown in FIG. 3, the push button part 18 is at the first position at the left end by the force of the coil spring 23, and the release piece 21 is positioned in the state of ultimate rotation in the clockwise direction. When the push button is pushed, as shown in FIG. 4, the push button part 18, the support member 19 and the release piece 21 integrally move in the right direction in the drawing, and the tip of the release piece 21 catches the fixed shaft 14 of the pawl 12. When the push button 18 is further pushed, as shown in FIG. 5, the tip of the release piece 21 pushes the fixed shaft 14 to rotate the pawl 12 in the clockwise direction, and the tip of the pawl 12 is released from the ratchet 2. Then, the ratchet 2 rotates by the force of the spiral spring 5 in the clockwise direction at a low speed under the brake action of the oil damper 29 provided at the end of the rotary shaft 3. After pushing the fixed shaft 14, the release piece 21 crosses over the fixed shaft 14 to move further in the rightward direction. As a result, as shown in FIG. 6, the pawl 12 rotates by the spring 16 in the counterclockwise direction, and engages the next tooth of the ratchet 2 to stop it. The ratchet rotates 1/6 revolution in the clockwise direction, and the rack 6 fixed with the plunger 10 descends by means of the pinion 4. By the descent of the plunger 10, a prescribed amount of the liquid sample is discharged from the nozzle tip 33. Thereafter, when the hand is released from the push button part 18, the push button part 18, the support member 19 and the release piece 21 move in the opposite direction by the force of the coil spring 23. The release piece 21 rotates in the counterclockwise direction opposed to the force of the spring 27, and crosses the fixed shaft 14, as shown in FIG. 7, to resume the original state of FIG. 3.

Figure 8:
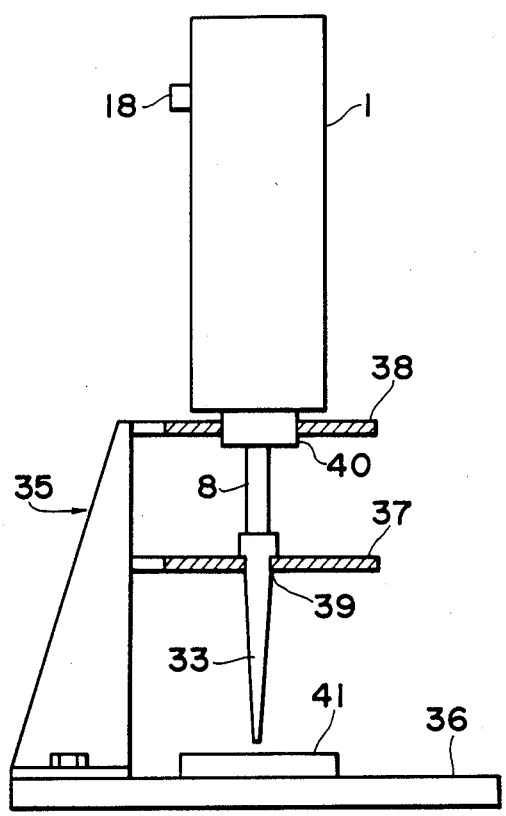
FIG. 8 is a partially cutaway side view indicating a state that the pipette is set to a frame.

The pipette is preferably used attached to a holder. As shown in FIG. 8, the holder 35 is formed of a base plate 36, a middle plate 37 and an upper plate 38. The middle plate 37 and the upper plate 38 are provided with an engaging hole 39, 40 to insert the nozzle tip 33 and the liquid injection part 8, respectively.

For carrying out the spotting, the pipette is fitted to the holder 35, and a chemical analytical slide 41 is placed on the base plate 36. Since the sizes of the chemical analytical slide 41 and the nozzle tip 33 are not varied, the distance between them are always fixed. As mentioned previously, a prescribed amount of a liquid is discharged gently, and thus a constant amount of the liquid sample is spotted to each chemical analytical slide 41 always at a fixed position in a fixed amount.

In the above pipette, the wheel 31 may be rotated by means of a power source such as motor or pulse motor, as well as by hand.

EXAMPLE 2

Figure 10:
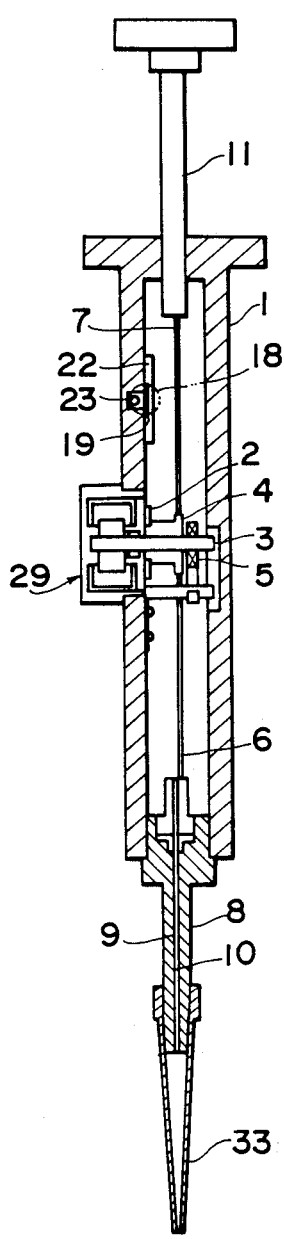
FIG. 10 is a sectional view taken on line B—B of FIG. 9.
Figure 9:
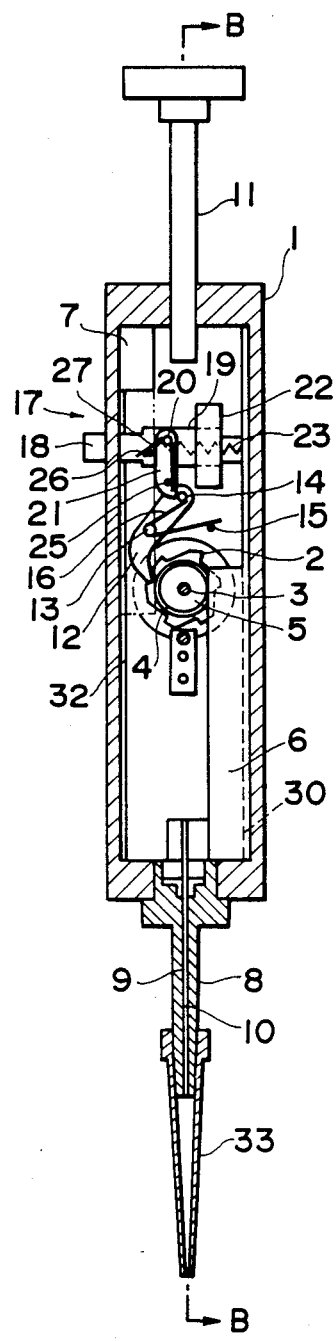
FIG. 9 is a vertical sectional view of another quantitative pipette embodying the invention.

Another example of the quantitative pipette is shown in FIGS. 9 and 10.

This pipette is similar to Example 1, except that a knob 11 and a second rack 7 are provided instead of wheel 31. The pinion 4 is engaged with the rack 6 on one side and with the second rack 7. These racks 6, 7 are fitted into respective guide channels 30, 32, thereby guided in the vertical direction. The second rack is fixed to the knob 11.

In operation of the above quantitative pipette the lower end of the nozzle tip 33 is immersed in a liquid sample in the state at which the knob 11 is raised to the uppermost position, and then the knob 11 is depressed. Thus, the second rack 7 descends, and the pinion 4 rotates in the counterclockwise direction opposed to the driving force of the spiral spring 5, and the rack 6 ascends to elevate the plunger 10. The other motions are the same as Example 1.

EXAMPLE 3

Figure 11:
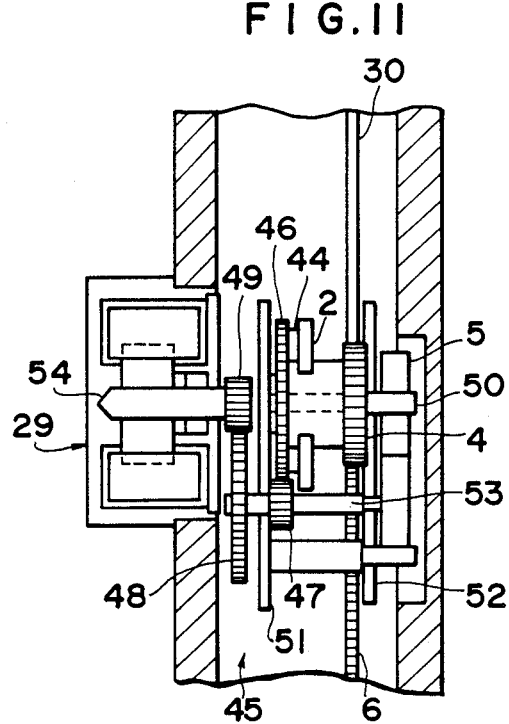
FIGS. 11 and 12 are sectional views of a principal part of two other quantitative pipettes embodying the invention, respectively.

Another example of the quantitative pipette is shown in FIG. 11.

In this pipette, the ratchet 2 is connected to the oil damper 29 through a one-way clutch 44 and a speed-increasing gear 45. One side of the one-way clutch 44 is fixed to the ratchet 2, and the other side is fixed to a gear 46 of the speed-increasing gear assembly 45. The other parts are similar to Example 2. When the knob 11 is depressed, the rotation of the ratchet 2 in a counterclockwise direction is transmitted to the gear 46. While, when the ratchet 2 rotates in the rear direction to discharge the sucked liquid, the clockwise rotation is transmitted to gear 46.

The speed-increasing gear assembly 45 has the above gear 46 connected to the one-way clutch 44 and gears 47, 48 and 49 successively engaged thereto. The gear 46 is fitted with a play to the shaft 50 fixed with the ratchet 2. The gears 47, 48 are fixed to the shaft 53 rotatably supported by support plates 51, 52, and the gear 49 is fixed to the shaft 54 of the oil damper 29. The gear 46 engages the gear 47, and the gear 48 engages the gear 49. Since the diameters of the gears 46 and 48 are greater than the gears 47 and 49, the rotation of the shaft 50 is transmitted to the shaft 54 with an increase successively. Therefore, in this pipette, the damper 29 does not act during the suction of the liquid sample, thus the depression of the knob 11 can easily be carried out with a little force. While, the shaft 54 of the damper 29 rotates in a high speed compared with the shaft 50 of the ratchet 2 at the discharge of the liquid, the damping effect to the rotation of the shaft 50 is greater.

EXAMPLE 4

Figure 12:
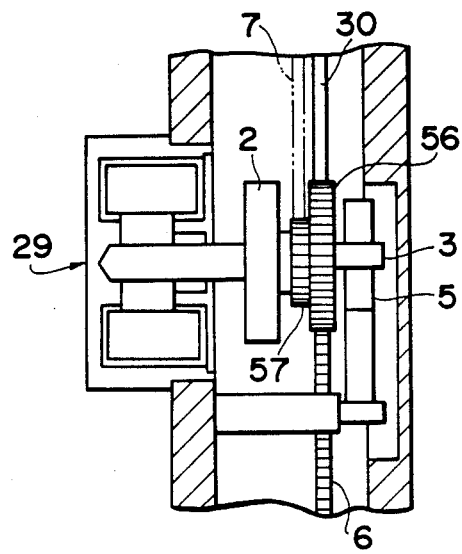

Another example of the quantitative pipette is shown in FIG. 12.

In this pipette, a large pinion 56 and a small pinion 57 are fixed to the shaft 3 fixed with the ratchet 2. The large pinion 56 engages the rack 6, while the small pinion 57 engages the second rack 7. Since the small pinion 57 engaged with the second rack 7 is smaller than the large pinion 56 engaged with the rack 6, the plunger 10 can be moved in a longer stance by the movement of the knob 11 in a shorter stroke.

I claim:

1. A quantitative pipette comprising:
   a frame having a liquid sample receiving chamber;
   a shaft rotatably supported by said frame;
   a ratchet mounted on said shaft for rotation therewith;
   a pinion mounted on said shaft for rotation therewith;
   a rack movably supported by said frame and engageable with said pinion, said rack being moveable between an ascended position and a descended position upon rotation of said pinion;
   a plunger connected to said rack, said plunger being conjointly moveable with said rack and reciprocally moveable within said receiving chamber;
   resiliently biased ratchet driving means supported by said frame for effecting rotation of said ratchet in a first direction;
   fluid operative damping means supported by said frame for reducing the rotational speed of said ratchet in said first direction to a value not greater than a prescribed speed;
   ratchet engaging means supported by said frame and engageable with said ratchet to limit rotation thereof in said first direction;
   activating means supported by said frame and operative for rotating said ratchet in a second direction, opposite to said first direction and against the action of said driving means, and for rotating said pinion in said second direction to effect ascended movement of said rack; and
   release means supported by said frame and operatively connected to said ratchet engaging means to permit intermittent disengagement of said ratchet engaging means from said ratchet, permitting intermittent rotation of said ratchet in said first direction, and thereby permitting similar rotation of said pinion in said first direction to effect descended movement of said rack;
   whereby ascended movement of said rack effects corresponding movement of said plunger to suck a prescribed amount of liquid sample into said receiving chamber, and descended movement of said rack effects corresponding movement of said plunger to discharge the liquid sample from said pipette.

2. The pipette as defined in claim 1 wherein said activating means comprises a wheel connected to said shaft to effect rotation thereof; said wheel being accessible outside of said frame.

3. The pipette as defined in claim 1 wherein said activating means comprises a rod; said frame having an opening to receive said rod and permit reciprocal movement of the distal end of said rod between a raised position and a lowered position within said frame; said rod being operatively connected to said pinion to effect rotation thereof; said rod having a knob portion accessible outside of said frame; whereby movement of said rod to its lowered position effects movement of said rack to its ascended position.

4. The pipette as defined in claim 3 further comprising a second rack movably supported by said frame and engageable with said pinion; said rod being operatively connected to said second rack.

5. The pipette as defined in claim 1 wherein said pinion is a first pinion and further comprising a second pinion mounted on said shaft for rotation therewith; said activating means comprising a rod; said frame having an opening to receive said rod and permit reciprocal movement of a distal end of said rod between a raised position and a lowered position within said frame; said rod being operatively connected to said second pinion to effect rotation thereof; said rod having a knob portion accessible outside of said frame; whereby movement of said rod to its lowered position effects movement of said rack to its ascended position.

6. The pipette as defined in claim 5 wherein said second pinion is smaller than said first pinion, and has fewer teeth than said first pinion.

7. The pipette as defined in claim 1 wherein said ratchet engaging means comprises a pawl pivotably supported by said frame and biased in engagement with a tooth of said ratchet.

8. The pipette as defined in claim 7 wherein said release means comprises a spring biased elongated button disposed for reciprocal movement between an inserted position and a normally withdrawn position relative to said frame, and a spring biased level supported by said frame and operatively interconnecting said button with said pawl; said frame having an opening to receive said button and permit one end thereof to be accessible outside of said frame; said button, said lever and said pawl cooperating such that movement of said button in the direction of its inserted position to said frame effects disengaged movement of said pawl away from said ratchet tooth to permit rotation of said ratchet in said first direction; the continued movement of said button to its fully inserted position serving to operatively disengage said lever from said pawl thereby to permit said pawl to engage the next adjacent tooth of said ratchet to again limit further rotation thereof, whereupon said button is permitted to be displaced back to its withdrawn position.

* * * * *